United States Patent [19]

Enokida et al.

[11] Patent Number: 4,882,427
[45] Date of Patent: Nov. 21, 1989

[54] TITANIUM PHTHALOCYANINE OPTICAL SEMICONDUCTOR MATERIAL AND ELECTROPHOTOGRAPHIC PLATE USING SAME

[75] Inventors: Toshio Enokida; Shigemasa Takano, both of Tokyo, Japan

[73] Assignee: Toyo Ink Manufacturing Co., Ltd., Tokyo, Japan

[21] Appl. No.: 312,425

[22] Filed: Feb. 17, 1989

Related U.S. Application Data

[63] Continuation of Ser. No. 120,840, Nov. 16, 1987, abandoned.

[51] Int. Cl.$^4$ ............................................. C09B 47/04
[52] U.S. Cl. .................................... 540/141; 540/140; 252/520; 252/501.1; 430/58; 430/72; 430/76
[58] Field of Search ............................ 430/58, 72, 76; 540/140, 141; 252/501.1, 520

[56] References Cited

U.S. PATENT DOCUMENTS

3,672,979  6/1972  Gerace .................................. 540/141
4,031,109  6/1977  Griffiths ............................... 540/141

*Primary Examiner*—J. David Welsh
*Attorney, Agent, or Firm*—Wenderoth, Lind & Ponack

[57] ABSTRACT

This invention provides an optical semiconductor material comprising: (1) a noncrystalline titanium phthalocyanine compound which does not show substantial X-ray diffraction peak in X-ray diffraction chart, (2) a pseudo-noncrystalline titanium phthalocyanine compound which shows broad X-ray diffraction peaks at Bragg angles of 6.9°, 15.5°, 23.4° and 25.5° measured by using CuKα beam and (3) an assembly of said noncrystalline titanium phthalocyanine compound and pseudo-noncrystalline titanium phthalocyanine compound. Further, this invention provides an electrophotographic plate comprising an electrically conductive substrate, and a charge-generating layer and charge-transferring layer on the electrically conductive substrate, characterized in that the charge-generating layer contains the above noncrystalline and/or pseudo-noncrystalline titanium phthalocyanine compound(s).

15 Claims, 5 Drawing Sheets

TITANIUM PHTHALOCYANINE OPTICAL SEMICONDUCTOR MATERIAL AND ELECTROPHOTOGRAPHIC PLATE USING SAME

This application is a continuation of now abandoned application Ser. No. 07/120,840, filed Nov. 16, 1987.

FIELD OF THE INVENTION

This invention relates to an optical semiconductor material composed of noncrystalline and/or pseudo(-meta) noncrystalline phthalocyanine compounds containing a core metal of titanium. Further, it relates to an electrophotographic plate having excellent exposure properties and spectral sensitivity by using same as a charge-generating agent.

In conventional electrophotographic plates, inorganic optical semiconductors such as selenium, selenium alloy, zinc oxide, cadmium sulfide, tellurium, etc., have been mainly used. In recent years, diode lasers have been remarkably developed, and compact and stable laser oscillators are now usable at low cost and beginning to find their applications to light sources for electrophotography. However, there are many problems in the use of diode lasers oscillating short wavelength lights in such light source devices, in respect of life and output. Therefore, it is not proper to use the conventional materials having sensitivity in the short wavelength region for the diode lasers, and it has been found necessary to make researches into materials having high sensitivity in the long wavelength region (not shorter than 780 nm).

Recently, active researches are under way with regard to dual (lamination)-type organic electrophotographic plates using organic material, especially phthalocyanine having sensitivity in the long wavelength region. For example, sensitive in the long wave-length region are divalent phthalocyanine compounds such as ε-type phthalocyanine (ε-CuPc), X-type metal-free phthalocyanine (X-H2Pc) and τ-type metal-free phthalocyanine (τ-H2Pc). As trivalent and tetravalent metal phthalocyanine compounds, there are chloroaluminum phthalocyanine (AlPcCl), chloroaluminum phthalocyanine chloride (ClAlPcCl), oxotitanium phthalocyanine (TiOPc), chloroindium phthalocyanine (InPcCl), which are made highly sensitive in the long wavelength region by depositing them on plates and contacting the plates to dissolving solvent vapor (Japanese laid-open patent publication Nos. 39484/82 and 166959/84). Further, there are processes for increasing sensitivity of phthalocyanine containing Ti, Sn and Pb as metals of Group IV by using a shifting agent such as various substituents, derivatives or crown ethers (Japanese laid-open patent publications Nos.36254/84 and 204045/84).

In that electrophotographic sensitized plate having a charge-generating layer prepared by depositing oxotitanium phthalocyanine or indium chlorophthalocyanine on a substrate and then contacting the substrate to dissolving solvent vapor, which is described in Japanese laid-open patent publication No. 166959/84, since its deposited layer is crystallized, the coating thickness becomes nonuniform, which causes degradation in electrophotographic properties and failure in images. Japanese laid-open patent publication No. 49544/84 discloses an electrophotographic plate having a charge-generating layer prepared by the use of oxotitanium phthalocyanine and a charge-transferring layer thereon which is mainly composed of a polyester prepared, as material, from 2,6-dimethoxy-9,10-dihydroxyanthracene. However, the electrophotographic plate disclosed therein has a high residual potential and many limitations in use.

Known oxotitanium phthalocyanine is a compound of firmly agglomerated block-like particles, has many inpurities in spaces from one particle to another, and has a large pigment particle diameter, since crystal growth always takes place in crystallization. For these reasons, a charge-generating layer prepared therefrom by deposition and dispersion coating lacks uniformity and dispersion stability. Therefore, it has been difficult to obtain an uniform charge-generating layer, and it has not been possible to obtain good images and stable plates.

For example, as is clear in X-ray diffraction charts shown in Japanese laid-open patent publications Nos. 49544/84 and 166959/84, the oxotitanium phthalocyanine compounds described therein have insufficient light absorption efficiency and have defects of degradation in carrier generation efficiency in a charge-generating layer, degradation in carrier injection efficiency into a charge- transferring layer and, further, insufficient satisfaction of various electrophotographic properties such as degradation resistance in repeated use, durability in printing or copying, image stability, and so on.

Japanese laid-open patent publication Nos. 109056/86 and 171771/86 or U.S. Pat. Nos. 4,664,997In disclose an electrophotographic plate having a charge-generating plate containing a titanium phthalocyanine compound prepared by the purification with hot water and then with N-methylpyrolidone and a binder polymer. Since, however, alcohols and ethers used before or after the heat suspension treatment with N-methylpyrolidone have high polarity, the crystal particles of the resulting phthalocyanine compound firmly agglomerate themselves at a purification step and cause a difficulty in purification thereafter; acids and intermediate impurities formed in synthesis are likely to remain in the agglomerated particles or on the surfaces thereof; and therefore N-methylpyrolidone used in the next step decomposes itself and reacts to inevitably degrade the electrical properties of the resulting product.

Such a plate has insufficient light absorption efficiency and has defects of degradation in carrier generation efficiency in a charge-generating layer, degradation in carrier injection efficiency into a charge-transferring layer and further, insufficient satisfaction of various electrophotographic properties such as degradation resistance in repeated use, durability in printing or copying, image stability, and so on.

LED is also in practical use as a digital light source for a printer. There are LEDs usable in the visible light region. In general, however, LEDs put into practical use have an oscillation wavelength of not shorter than 650 nm, and the standard LEDs have an oscillation wavelength of 660 nm. It cannot be said that azo compound, perylene compound, selenium, zinc oxide, etc., have sufficient optical sensitivity around 650 nm. Electrophotographic plates using oxotitanium phthalocyanine, as a charge-generating agent, reported heretofore have maximum sensitivity in a wavelength of only 780 to 830 nm. The sensitivity thereof lowers in 600 to 700 nm, and such plates are not sufficient as a plate for LEDs.

SUMMARY OF THE INVENTION

It is an object of this invention to provide an optical semiconductor material and electrophotographic plate by removing the defects of a phthalocyanine compound in the optical semiconductor material and an electrophotographic plate using said compound in a charge-generating layer.

It is another object of this invention to provide a noncrystalline or pseudo(meta)-noncrystalline optical semiconductor material having good sensitivity both in the short and long wavelength regions.

It is still another object of this invention to provide an electrophotographic plate having a charge-generating layer which is excellent in stability and uniform and being capable of giving clear images.

It is yet another object of this invention to provide an electrophotographic plate which is excellent in light absorption efficiency and excellent in carrier generation efficiency of a charge-generating layer and carrier injection efficiency into a charge-transferring layer.

Furthermore, it is an object of this invention to provide an electrophotographic plate which is excellent in exposure sensitivity and spectral sensitivity, and excellent in degradation resistance in long-period repeated use, durability in printing or copying, and image stability.

This invention provides an optical semiconductor material comprising: (1) a noncrystalline titanium phthalocyanine compound which does not show substantial X-ray diffraction peak in X-ray diffraction chart, (2) a pseudononcrystalline titanium phthalocyanine compound which shows broad X-ray diffraction peaks at Bragg angles of 6.9°, 15.5°, 23.4° and 25.5° measured by using CuKα beam and (3) an assembly of said noncrystalline titanium phthalocyanine compound and pseudo-noncrystalline titanium phthalocyanine compound.

Further, this invention provides an electrophotographic plate comprising an electrically conductive substrate, and a charge-generating layer and charge-transferring layer on the electrically conductive substrate, characterized in that the charge-generating layer contains the above noncrystalline and/or pseudo-noncrystalline titanium phthalocyanine compound(s).

DETAILED DESCRIPTION OF THE INVENTION

The titanium phthalocyanine compounds of this invention may be used alone or in combination if these compounds are noncrystalline or pseudo(meta)-noncrystalline.

In conventionally reported electrophotographic plate containing crystalline coarse particles in a charge-generating layer, the light absorption ratio lowers to cause a descrease in the number of carriers to be generated and a decline in optical sensitivity. Further, since its charge-generating layer is nonuniform, the carrier injection efficiency into a charge-transferring layer lowers. As a result, there are those phenomena in electrostatic properties that are undesirable in the sensitivity of electrophotographic plates, e.g., an induction phenomenon takes place, a surface potential drops, potential stability in repeated use becomes poor, etc. Moreover, a produced image lacks uniform-ity and suffers from small defects.

Known oxotitanium phthalocyanine compounds used in charge-generating layers are those which have X-ray diffraction peaks, measured by using Cu-Kα radiation of λ=1.5418 (A.U.), at $2\theta(\pm 2°)$=9.2°, 13.1°, 20.7°, 26.2° and 27.1° ($\theta$ is Bragg angle) (Japanese laid-open patent publication No. 49544/84), at $2\theta$=7.5°, 12.6°, 13.0°, 25.4°, 26.2° and 28.6° (Japanese laid-open patent publication No. 166959/84), at $2\theta$=7.5°, 12.3°, 16.3°, 25.3° and 28.7° (Japanese laid-open patent publication No. 239248/86) and at $2\theta$=9.3°, 10.6°, 13.2°, 15.1°, 15.7°, 16.1°, 20.8°, 23.3°, 26.3° and 27.1° (Japanese laid-open patent publication No. 67094/87, U.S. Pat. No. 4,664,997). However, these compounds are of crystalline oxotitanium phthalocyanine, and the materials synthesized according to the processes described therein and purified with solvents have many problems for the afore-mentioned reasons, and cannot be said to form high-quality electrophotographic plates.

Japanese laid-open patent publication No. 221253/87 also discloses "amorphous" oxotitanium phthalocyanine obtained by carrying out the acid pasting of a crude of oxotitanium phthalocyanine. The oxotitanium phthalocyanine disclosed therein is obtained by the acid pasting, and has peaks at 7.5°, 16.3° and 25.3° of Bragg angle ($2\theta \pm 0.2°$). And it is an α-type low-crystalline product and inferior in the sensitivity in the wavelength of about 600 nm.

An electrophotographic plate using a noncrystalline or pseudo-noncrystalline type of this invention as a charge-generating agent has good sensitivity at the time of exposure and exhibits nearly constant and good values of spectral sensitivity in the range from 600 to 850 nm, as compared with those of afore-mentioned crystalline oxotitanium phthalocyanine.

The following is a process for the preparation of the noncrystalline or pseudo-noncrystalline titanium phthalocyanine compound of this invention.

In general, phthalocyanine is prepared by the phthalodinitrile method in which phthalodinitrile and methyl chloride are melted by heating or heated in the presence of an organic solvent, the Weiler method in which anhydrous phthalic acid is melted with urea and metal chloride by heating or heated therewith in the presence of an organic solvent and the other method in which cyanobenzamide and a metal salt are reacted at a high temperature or dilithium phthalocyanine and a metal salt are reacted. However, the process for the preparation of phthalocyanine is not limited thereto. Preferable as organic solvent are inert solvents having high boiling points such as α-chloronaphthalene, β-chloronaphthalene, α-methylnapthalene, methoxynaphthalene, diphenylethane, ethylene glycol, dialkyl ether, quinoline, dichlorobenzene, dichlorotoluene, etc. Namely, the titanium phthalocyanine compound of this invention can be synthesized by, for example, heating phthalodinitrile and a titanium compound (preferably, titanium tetrachloride which produces fewer and less by-products and is inexpensive) in the above solvent at a temperature in the range from 150° C. to 300° C. with stirring. Indoline-type compounds such as diiminoindoline, etc., or indolenine-type compounds such as 1-amino-3-iminoisoindolenine may be used in place of phthalodinitrile, and the titanium compound is not limited to titanium tetrachloride and may be titanium trichloride and titanium tetrabromide.

Titanium-containing phthalocyanine used in this invention can be obtained by purifying a product synthesized in a known process by Moser and Thomas' Phthalocyanine Compound or the afore-mentioned appropriate process with acid, alkali, acetone, methylethylketone, tetrahydrofuran, pyridine, quinoline, sulfolane, α-chloronaphthalene, toluene, dioxane, xylene, chloroform, carbon tetrachloride, dichoro- methane, trichloropropane, N,N'-dimethylacetamide, N-methyl-pyrolidone, N,N'-dimethylfolmaldehyde, N-mehthylpyrolidone, N,N'-dimethylfolmaldehyde, etc. Examples of purification include washing, recrystallization, Soxhlet extraction, thermal suspension, etc. Purification can also be carried out by sublimation. However, the purification method is not limited thereto, and may be any method if unreacted materials, by-products and impurities can be removed.

In addition, the titanium phthalocyanine compound of this invention is mainly a compound having TiO as a core. It is possible to use, as a starting material, compounds having $TiCl_2$, $TiBr_2$, etc., as a core. However, the core, $TiCl_2$, $TiBr_2$, etc., easily forms TiO due to treatment thereafter, and it is difficult to obtain a phthalocyanine compund having such $TiCl_2$, $TiBr_2$, etc., as a core. Further, said titanium phthalocyanine compound may be a low-halogenated compound having not more than 2 halogen substituents in the phthalocyanine molecule. The titanium phthalocyanine compound of this invention is a compound which does not substantially contain any other substituent except halogen.

Titanium phthalocyanine compounds obtained in the above methods are crystalline and do not have sufficient sensitivity and properties. Therfore, it is necessary to further carry out a crystal transition step and noncrystallization step to obtain the desired noncrystalline or pseudononcrystalline compound.

A noncrystalline titanium phthalocyanine compound is prepared in the following step. That is, a phthalocyanine derivative having a substituent in the phthalocyanine molecule is added to a crystalline titanium phthalocyanine compound obtained in the above methods, and then the addition product is subjected to acid pasting or acid slurry method. The acid pasting or acid slurry method is a known pigmentation methods using sulfuric acid, etc. The acid pasting method is treatment carried out by dissolving crude cake in a somewhat larger amount of concentrated sulfuric acid etc., and the acid slurry method is treatment with sulfuric acid, etc., the amount and concentration of which are not sufficient to dissolve a pigment. Immediately after treated by the acid pasting or acid slurry method, the resulting compound is not in a completely noncrystalline state, but exhibits pseudononcrystallinity. Then, the compound is noncrystallized by applying thereto, a distorting force and shearing force brought by the mechanical milling method. Examples of devices usable for noncrystallization include a kneader, banbury mixer, attriter, edge runner mill, roll mill, ball mill, sand mill, SPEX mill, homomixer, disperser, agitator, jaw crusher, stamp mill, cutter mill, micronizer, etc. Examples of dispersion media used in noncrystallization include glass bead, steel bead, zirconia bead, alumina ball, zirconia ball, steel ball, flint stone, etc., however these media are not always necessary. Milling auxiliary such as common salt, Glauber's salt, etc., may be used if necessary.

For noncrystallization, it is desirable to employ a dry method by which a distorting force and shearing force are most efficiently applied to the resulting product to be milled, however, a wet method is sometimes selected. In the wet method, a liquid solvent is used at the time of milling. As the solvent, at least one solvent may be selected from alcohol type solvents such as glycerine, ethylen glycol, diethylen glycol, polyethylene glycol, etc., carbitol-type solvents, ketone-type solvents, esterketone-type solvents, etc. In the above process, a titanium pthalocyanine compound is noncrystallized until it shows no X-ray diffraction peak in X-ray diffraction chart.

A phthalocyanine derivative having at least one substituent in the phthalocyanine molecule may be mixed before the chemical treatment such as acid pasting or acid slurry method, or may be mixed after the chemical treatment and milled. It enhances the noncrystallinity to use a phthalocyanine derivative having a substituent in the phthalocyanine molecule at the above noncrystallization step. That is, the crystallinity is decreased and the noncrystallinity is enhanced by adding to a titanium phthalocyanine compound a phthalocyanine derivative having a substituent in its benzene nucleus. A phthalocyanine derivative having oxotitanium(TiO) in the core is preferable, however, it is possible to use any phthalocyanine derivative that has no metal as a core, or has a metal such as copper, nickel, cobalt, aluminum, gallium, vanadium, etc., or oxide or chloride thereof as a core.

Examples of the substituent include an amino group, nitro group, alkyl group, alkoxy group, cyano group, mercapto group, halogen atom, etc., and further include sulfone group, carboxylic acid group, a metal salt thereof, ammonium group, amine salt, etc., as a comparatively simple substituent. Further, various substituent may be introduced into the benzene nucleus through an alkylene group, sulfonyl group, carbonyl group, imino group, etc., and examples of said various substituents include agglomeration preventors, crystal growth preventors or crystal transition preventors conventionally known in the art of phthalocyanine pigments (e.g., U.S. Pat. No. 4,088,507).

Further, phthalocyanine nitrogen analogues may be used to decrease the crystallinity in place of the phthalocyanine derivative, and various porphines, for example, tetrapyridinoporphiradine in which the quinoline nucleus is substituted for one of the benzene nuclei of phthalocyanine, may be used. Furthermore, the addition of titanium oxide, zinc oxide, silicon oxide, etc., makes it possible to decrease the crystallinity besides phthalocyanine derivative. The mixing ratio of the phthalocyanine compound and the phthalocyanine derivative having a substituent in the phthalocyanine molecule (which may be a phthalocyanine-type nitrogen analogue or inorganic compound) differs depending upon what the substituent is and how the titanium compound is crystallized. However, said mixing ratio is preferably between 100/50 and 100/0.1 (by weight).

When a crystalline titanium phthalocyanine compound having a substituent such as a chlorine atom, etc., is obtained, it is possible to noncrystallize the crystalline titanium phthalocyanine compound by decreasing the mixing ratio of a phthalocyanine derivative to be added separately or without adding it.

The noncrystalline titanium phthalocyanine compound can also be prepared by mere mechanical milling without the chemical treatment of acid pasting or acid slurry method or mixing therewith a phthalocyanine derivative. However, in such a case, the noncrystallization often takes a rather longer time.

A pseudo-noncrystalline titanium phthalocyanine compound is prepared in the following steps. That is, a phthalocyaine derivative having a substituent in the phthalocyanine molecule is added to the crystalline phthalocyanine compound prepared in the above process, and then the addition product is chemically treated, such as, by the acid pasting or acid slurry method, to give a pseudononcrystalline titanium phthalocyanine. The pseudononcrystalline titanium phthalocyanine compounds can be also obtained by adding at least one oxide selected from the class consisting of titanium oxide, zinc oxide, and silicon oxide in place of the phthalocyanine derivative at the time of subjecting a crystalline titanium phthalocyanine compound to the acid pasting or acid slurry treatment.

In the case of a titanium phthalocyanine compound having a substituent such as a chlorine atom, it is possible to achieve the pseudo-noncrystallization by reducing the proportion of the phthalocyanine derivative or without adding it. The resulting pseudo-noncrystalline titanium phthalocyanine compound has increased crystallinity by treating it with a solvent or carrying out the aforementiond wet milling method. And the retreatment thereof according to the process of this invention ca give the intended product.

That is, a pseudo-noncrystalline titanium phthalocyanine compound has broad X-ray diffraction peaks, measured by using CuKα beam, at 6.9°, 15.5°, 23.4° and 25.5° of Bragg angle ($2\theta \pm 0.2°$) in X-ray diffraction chart. However, if the crystal growth is enhanced by any method, the peak intensity at each of the Bragg angles become large and the compound is crystallized. A phthalocyanine compound having X-ray diffracton peaks at the above angles is one having a novel crystal structure, and can give very excellent electrophotographic properties as charge-generating layer as compared with oxotitanium phthalocyanine hitherto reported. And pseudononcrystalline one is far superior in the properties of electrophotographic plate such as coating property, spectral sensitivity, etc. A titanium phthalocyanine compound having intense X-ray diffraction peaks can also give a noncrystalline product through a pseudo-noncrystalline one by the mechanical milling method, especially by using the dry method.

A noncrystalline titanium phthalocyanine compound can be also obtained by sublimation and milling. For example, it can be obtained by heating a titanium phthalocyanine compound crude obtained by various methods to 400° C.–600° C. to sublimate it under vacuum and deposit it quickly on a substrate, and by mechanical-milling the resulting product.

A charge-generating layer using a noncrystalline or pseudo-noncrystalline titanium phthalocyanine compound obtained according to this invention is a uniform layer having large light absorption efficiency; has characteristics that there are fewer and less spaces between one particle and another in a charge-generating layer, between a charge-generating layer and a charge-transferring layer and a charge-generating layer and a barrier layer (undercoated layer) or an electrically conductive substrate; and can give an electrophotographic plate which satisfies various requirements of the properties of an electrophotographic plate such as potential stability and prevention of rise in potential on lighter places, reduction of image failure, durability in printing or copying at the time of repeated use.

An n-type electrophotographic plate is prepared by laminating an undercoating layer, a charge-generating layer and a charge-transferring layer onto a conductive substrate in this order. And a p-type electrophotographic plate is prepared by placing a charge-transferring layer and then a charge-generating layer on an undercoated layer, or by dispersion-coating a charge-generating agent and a charge-transferring agent together with a suitable resin on an undercoated layer. In both of said electrophotographic plates, an overcoating layer may be provided thereon for the protection of the surface, prevention of filming due to a toner, etc., if necessary. Said undercoated layer may be omitted if unnecessary.

The titanium phthalocyanine compound of this invention can be properly used in all of the above-mentioned electrophotographic plates. And the charge-generating layer is obtained by dispersion-coating the titanium phthalocyanine compound and a resin with a suitable solvent. If necessary, the resin may be omitted.

It is known that a charge-generating layer is obtained by deposition. The material obtained according to this invention, in which fine primary particles are further treated and noncrystallized and impurities present in gaps from one paricle to another are removed, can be deposited very effectively and is so effective as depositing material.

An electrophotographic plate is coated by the use of a spin coater, applicator, bar coater, immersing coater, doctor blade, roller coater, curtain coater, bead coater, etc., and dried at 40° to 200° C. for 10 minutes to 6 hours under the stationary or air-blowing conditions. The coating is carried out such that the coating thickness becomes 0.01 to 5 microns, preferably 0.1 to 1 micron, after it is dried.

The binder used at the time of forming a charge-generating layer by coating can be selected from a wide range of insulating resins and organic optical conductive polymers such as poly-N-vinyl carbazole, polyvinyl anthlacene, polyvinyl pyrene, etc. Preferably, examples of the binder include insulating resins such as polyvinyl butyral, polyallylate (polycondensate of bisphenol A and phthalic acid, etc.), polycarbonate, polyester, phenoxy resin, polyvinyl acetate, acrylic resin, polyacrylamide resin, polyamide resin, polyvinyl pyridine, cellulose-type resin, urethane resin, epoxy resin, silicon resin, polystyrene, polyketone resin, polyvinyl chloride, vinyl chloride-vinyl acetate copolymer, polyvinyl acetal, polyviny formal, polyacrylonitrile, phenol resin, melamine resin, casein, polyvinyl alcohol, polyvinyl pyrolidone.

The amount of a resin to be contained in the charge-generating layer is not more than 100% by weight, preferably 40% by weight, relative to the noncrystalline or pseudononcrystalline titanium phthalocyanine compound. These resins may be used alone or in comibination with at least one other of them.

The solvent to dissolve these resins differs depending upon kind of resin and it is desirable to select it from those that do not have influence at the time of coating a charge-tansferring layer and undercoating layer to follow hereinbelow. Specifically, there may be used aromatic hydrocarbons such as benzene, xYlene, ligroin, monochlorobenzene, dichlorobenzene, etc., ketones such as acetone, methylethyl ketone, cyclohexanon, etc., alcohols such as methanol, ethanol, isopropanol, etc., esters such as ethyl acetate, methylcellosolve, etc., aliphatic halogenated hydrocarbons such as carbon tetrachloride, chloroform, dichloromethane, dichloroethane, trichloroethylene, etc., ethers such as tetrahydrofuran, dioxane, ethylen glycol monomethyl ether, etc., amides such as N,N-dimethylformaldehyde, N,N-dimethylacetamide, etc., and sulfoxides such as dimethylsulfoxide, etc.

The charge-generating layer may be formed by deposition. The deposition is carried out under vacuum of between about $10^{-5}$ and $10^{-6}$ torr, and the coating thickness is 0.01 to 5 microns, preferably 0.05 to 0.5 microns.

The charge-transferring layer is formed by itself or by dissolving and dispersing it in a binder resin. There are an electron-transfer substance and a positive hole-transfer substance as an charge-transfering substance.

Examples of the electron-transfer substance include electron-attracting substances such as chloroanil, bromoanil, tetracyanoethylene, tetracyanoquinodimethane, 2,4,7-trinitro-9-fluorenone, 2,4,5,7-tetranitro-9-fluorenone, 2,4,7-trinitro-9-dicyanomethylenefluorenone, 2,4,5,7-tetranitroxanthone, 2,4,8-trinitrothioxanthone, etc., and polymers produced therefrom.

Examples of the positive hole-transfer substance include hydrazones such as pyrene, N-ethylcarbazole, N-isopropycarbazole, N-methyl-N-phenylhydrazino-3-methylidene9-ethylcarbazole, N,N-diphenylhydrazino-3-methylidene-9-ethylcarbazole, N,N-diphenylhydrazino-3-methylidene-10-ethylphenothiazine, N,N-diphenylhydrazino-3-methyidene-10-ethylphenoxazine, p-diethlaminobenzaldehyde-N,N-diphenylhydrazone, p-diethlaminobenzaldehyde-N-α-naphthyl-N-phenylhydrazone, p-pyrrolidino-benzaldehyde-N,N-diphenylhydrazone, 2-methyl-4-dibenzylaminobenzaldehyde-1'-ethyl-1'-benzthiazolylhydrazone, 2-methyl-4-dibenzylaminobenzaldehyde-1'-propyl-1'-benzthiazolylhydrazone, 2-methyl-4-dibenzylaminobenzaldehyde-1', 1'-diphenylhydrazone, 9-ethylcarbazole-3 carboxyaldehyde-1'-methyl-1'-phenylhydrazone, 1-tolyl-1,2,3,4-tetrahyroquinoline-6-carboxyaldehyde-1', 1'-diphenylhydrazone,1,3,3-trimethylindolenine-α-aldehyde-N,N-diphenylhydrazone, p-diethylbenzaldehyde-3-methylbenzthiazolinone-2-hydrazone, etc., pyrazolines such as 2,5-bis(p-diethyaminophenyl)-1,3,4-oxadiazole, 1-phenyl-3-(p-diethylaminostyryl)-5-(p-diethylaminophenyl)pyrazoline, 1-[quinolyl(2)]-3-(p-diethylaminostyryl)-5-(p-diethylaminophenyl)pyrazoline, 1[pyridyl(2)]-3-(p-diethylaminostyryl)-5-(p-diethylaminophenyl)pyrazoline, 1-[6-methoxy-pyridyl(2)]-3-(p-diethylaminostyryl)-5-(p-diethylaminophenyl)pyrazoline, 1-[pyridyl(3)]-3-(p-diethylaminostyryl)-5-(p-diethylaminophenyl)-pyrazoline, 1-[lepidyl(2)]-3-(p-diethylaminostyryl)-5-(p-diethylaminophenyl)pyrazoline, 1-[pyridyl(2)]-3-(p-diethylaminostyryl)-4-methyl-5-(p-diethylaminophenyl)- pyrazoline, 1-[pyridyl(2)]-3-(α-methyl-p-diethylaminostyryl)-5-(p-diethylaminophenyl)pyrazoline, 1-phenyl-3-(p-diethylaminostyryl)-4-methyl-5-(p-diethylaminophenyl)pyrazoline, 1-phenyl-3-(α-benzyl-p-diethylaminostyryl)-5-(p-diethylaminophenyl)-6-pyrazoline, spiropyrazoline, etc., oxazole-type compounds such as 2-(p-diethylaminostyryl)-6-diethylaminobenzoxazole, 2-(p-diethylaminophenyl)-4-(p-diethylaminophenyl)-5-(2-chlorophenyl)oxazole, etc., stilben-type compounds such as 4,4-bis[2-(4-diethylaminophenyl)-vinyl]biphenyl, α-phenyl-4-N,N-diphenylamino-stilben, etc., thiazole-type compounds such as 2-(p-diethylaminostyryl)-6-diethylaminobenzothiazole, etc., triarylmethane-type compounds such as bis(4-diethlamino-2-methylphenyl)-phenylmethane, etc., polyaryalkanes such as 1,1-bis(4-N,N-diethylamino-2-methylphenyl)heptane, 1,1,2,2-tetra kiss(4-N,N-dimethylamino-2-methylphenyl)ethane, etc., and the other compounds such as triphenylamines, poly-N-vinylcarbazole, polyvinylpyrene, polyvinylanthracene, polyvinylacridine, poly-9-vinylphenylanthracene, pyreneformaldehyde resine, ethylcarbazoleformaldehyde resin, etc., however, the charge transferring substance is not limited thereto.

Besides the above organic charge-transferring substances, inorganic materials such as selenium, seleniumtellurium, amorphous silicon, cadmium sulfide, etc., may be used.

These charge-transferring substances may be used alone or at least two of them may be used in combination.

Examples of resins usable for the charge-transferring layer include insulating resins such as silicon resin, ketone resin, polymethylmethacrylate, polyvinylchloride, acrylic resin, polyallylate, polyester, polycarbonate, polystyrene, acrylonitrile-styrene copolymer, acrylonitrile-butadiene copolymer, polyvinylbutyral, polyvinylformal, polysulfone, polyacrylamide, polyamide, chlorinated rubber, etc., poly-N-vinylcarbazole, polyvinylanthracene, polyvinylpyrene, etc.

The coating thereof is carried out by the use of a spin coater, applicator, spray coater, bar coater, immersion coater, doctor blade, roller coater, curtain coater, bead coater, etc., such that the coat thickness becomes 5 to 50 microns, preferably 10 to 20 microns after dried.

In addition to these layers, an undercoating layer may be provided onto a conductive substrate in order for prevention of fall of chargeability, improvement of adhesion, etc.

Examples of the undercoating layer include polyamides such as nylon 6, nylon 66, nylon 11, nylon 610, copolymeric nylon, alkoxymethylated nylon, etc., casein, polyvinylalcohol, nitrocellulose, ethylene-acrylic acid copolymer, gelatine, polyurethane, polyvinylbutyral, and metal oxides such as aluminum oxide, etc. The undercoating layer may also be adjusted by arranging that the resin should contain metal oxide such as zinc oxide, titanium oxide, etc., and conductive and dielectric particles such as silicon nitride, carbon black, etc.

The material of this invention has absorption peaks in the wavelengths of over 800 nm and 650 nm. It can be used not only in a copying machine, printer, etc., as an electrophotographic plate, but also in a sollar cell, photoelectric transfer element and absorption material for optical disc.

The noncrystalline or pseudo-noncrystalline titanium phthalocyanine compound of this invention is an optical semiconductor material exhibiting good sensitivity in the region from short wavelength to long wavelength. The electrophotographic plate using the optical semiconductor material of this invention as a charge-generating layer is excellent in exposure sensitivity properties and spectral sensitivity characteristics, also excellent in antidegradation property, durability in printing and image stability in a long-term use, and can give good images. Further, since the optical semiconductor material of this invention has high sensitivity in the wavelength region of not shorter than 750 nm and 650 nm, it is much excellent as an electrophotographic plate to be used with diode laser and printer which use LED as a light source.

Examples of this inventon are specifically explained hereinbelow. "part" in Examples stands for "part by weight".

A phthalocyanine derivative used in this invention can be prepared by, for example, the following process. "Pc" outside parentheses denotes phthalocyanine residue and number denotes an average substituent number based on analysis. In the following Tables, CuPc denotes copper phthalocyanine residue, H2Pc denotes non-metal phthalocyanine residue, NiPc denotes nickel phthalocyanine residue, AlPc denotes alminum phthalocyanine residue, CoPc denotes cobalt phthalocyanine residue, and VoPc denotes vanadium phthalocyanine residue.

REFERENTIAL EXAMPLE 1

A mixture of 15 parts of oxotitanium phthalocyanine, 500 parts of trichlorobenzene, 25 parts of acetyl chloride and 70 parts aluminum chloride was stirred at 60°–80° C. for 8 hours, and then charged into water. The resulting solid was filtrated, washed with water and dried to give a compound of the following formula.

TiOPc(COCH2Cl)1.3

Amines were reacted therewith in a known method to give various phthalocyanine derivatives shown in Table 1.

REFERENTIAL EXAMPLE 2

Oxotitanium phthalocyanine was chloromethylated, and then reacted with various amines to give phthalocyanine derivatives shown in Table 2.

REFERENTIAL EXAMPLE 3

Oxotitanium phthalocyanines halogenated by a conventional method are shown in Table 3.

REFERENTIAL EXAMPLE 4

Oxotitanium phthalocyanine chlorosulphonated in a conventioal method was reacted with various amines to give phthalocyanine derivatives shown in Table 4.

REFERENTIAL EXAMPLE 5

Phthalocyanine derivatives were prepared by changing the core metal from titanium to the other metal or without using any metal. Prepared phthalocyanine derivatives are shown in Table 5.

EXAMPLE 1

Phthalodinitrile (20.4 parts) and 7.6 parts of titanium tetrachloride were reacted in 150 parts of quinoline at 220° 1 C. under heat for 4 hours and then the solvent was removed by vapour distillation. Then, the resulting product was purified with a 2% hydrochloric acid aqueous solution and then with a 2% sodium hydroxide aqueous solution, and then it was purified with acetone. The resulting product was dried to give 21.3 parts of oxotitanium phthalocyanine (TiOPc).

Figure 1:
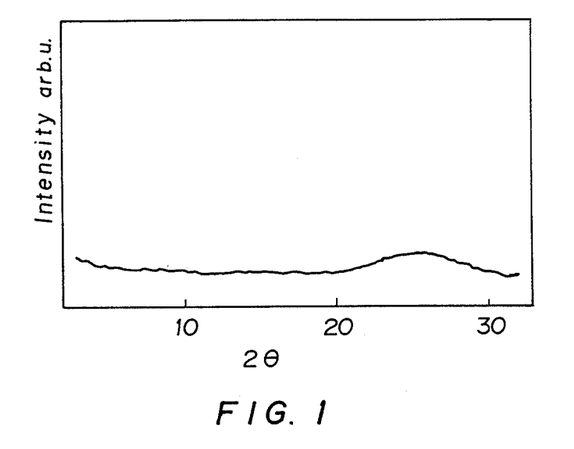
FIGS. 1 to 4 show X-ray diffraction charts, measured by using Cu-Kα beam, of the noncrystalline or pseudo-noncrystalline titanium phthalocyanine compounds of this invention.

The above TiOPc crude (10 parts) was milled by a ballmill for 180 hours. X-ray diffraction of the milled sample was measured by the use of Cu-Kα beam. FIG. 1 shows the results of the X-ray diffraction measurement. The milled sample was noncrystalline TiOPc without a clear X-ray diffraction peak.

The following is a process for the preparation of electrophotographic plate.

Copolymeric nylon (10 parts) (produced by TORAY Co, Ltd. AMILAN) was mixed with 190 parts of ethanol by a ball mill for 3 hours, and a dissolved liquid thereof was coated by a wire bar on a sheet prepared by depositing alminum on a polyethylene terephthalate (PET) film, and then the coated sheet was dried at 100° C. for 1 hour to give a sheet having a 0.5 micron thick undercoated layer.

A noncrystalline TiOPc (2 parts) obtained in this Example was dispersed in a resin liquid prepared by dissolving 97 parts of THF and 1 part of polyvinylbutyral (produced by Sekisui Chemical Co.,Ltd. BH-3), over 6 hours by a ball mill.

This dispersion liquid was coated on the undercoated layer and dried at 100° C. for 30 minutes.

TABLE 1

| No. | Derivative |
|---|---|
| 1-a | TiOPc(COCH2Cl)1.3 |
| 1-b | TiOPc(COCH2NHC2H5)1.1 |
| 1-c | TiOPc(COCH2NHC8H17)1.1 |
| 1-d | TiOPc(COCH2NHC2H2OH)1.1 |
| 1-e | TiOPc(COCH2N(C2H5)2)1.1 |
| 1-f | TiOPc(COCH2N(H)(C6H5))1.2 |

TABLE 2

| No. | Derivative |
|---|---|
| 2-a | TiOPc(CH2N(CO)2C6H4)1.4 |
| 2-b | TiOPc(CH2N(C2H5)2)3.0 |
| 2-c | TiOPc(CH2NH—C6H4—CH3)2.1 |
| 2-d | TiOPc(CH2N⟨ring⟩)1.8 |

TABLE 2-continued

| No. | Derivative |
|---|---|
| 2-e | TiOPc←(CH₂N⟨cyclohexyl-H⟩)₂.₀ |
| 2-f | TiOPc←(CH₂N⟨(CH₂—CH₂)₂⟩CH₂)₂.₁ |

TABLE 3

| No. | Derivative |
|---|---|
| 3-a | TiOPc←(Cl)₄.₀ |
| 3-b | TiOPc←(Br)₁₂.₀ |

TABLE 4

| No. | Derivative |
|---|---|
| 4-a | TiOPc←(SO₂N(C₂H₅)₂)₂.₃ |
| 4-b | TiOPc←(SO₂N⟨cyclohexyl-H⟩|H)₁.₇ |
| 4-c | TiOPc←(SO₃NHC₃H₇)₀.₃ |
| 4-d | TiOPc←(SO₂NH—C₆H₄—CH₃)₃.₁ |
| 4-e | TiOPc←(SO₂N(CH₃)—C₆H₄)₃.₄ |
| 4-f | TiOPc⟨(SO₃H)₀.₅, (SO₂NHCH₂CHClCH₂Cl)₁.₅⟩ |
| 4-g | TiOPc←(SO₂NHC₂H₄—C₆H₄—SO₂—C₂H₄—N(C₂H₅)(C₂H₅))₃.₅ |
| 4-h | TiOPc⟨(SO₃H)₂.₀, (SO₂NH—C₆H₅)₂.₀⟩ |
| 4-i | TiOPc←(SO₂NH—C₆H₄—SO₃⁻NH₄⁺)₃.₅ |

TABLE 5

| No. | Derivative |
|---|---|
| 5-a | CuPc←(COCH₂Cl)₁.₂ |
| 5-b | H₂Pc←(COCH₂NHC₂H₂OH)₁.₁ |
| 5-c | NiPc←(COCH₂N(H)—C₆H₅)₁.₃ |
| 5-d | CuPc←(CH₂N⟨(CO)₂-C₆H₄⟩)₁.₅ |
| 5-e | H₂Pc←(CH₂N⟨(CH₂CH₂)₂⟩CH₂)₂.₄ |
| 5-f | CuPc←(Cl)₃.₈ |
| 5-g | AlPc←(Cl)₃.₀ |
| 5-h | H₂Pc←(Br)₁₁.₀ |
| 5-i | CoPc←(Br)₉.₈ |
| 5-j | CuPc←(SO₂N(C₂H₅)₂)₂.₄ |
| 5-k | H₂Pc←(SO₂N(CH₃)—C₆H₅)₃.₀ |
| 5-l | VOPc⟨(SO₃H)₂.₁, (SO₂NH—C₆H₅)₁.₉⟩ |

And then 0.2 micron thick charge-generating layer was formed thereon, and then a liquid as a chage-transferring agent prepared by dissolving 10 parts of 1-phenyl-1,2,3,4-tetrahydroquinoline-6-carboxyalde-hyde-1',1'-diphenylhydrazone and 10 parts of a polycarbonate resin (produced by Teijin Chemical Co., Ltd. PANLITE K 1300) in 100 parts of methylene chloride was coated on the charge-generating layer, and dried to form a 1.5 microns thick charge transferring layer. The properties of the resulting electrophotographic plate were measured. The results are shown in Tabel 8.

The electrophotographic properties of plates prepared in this Example and the following examples were measured in the following method.

A sensitized plate was corona-charged at a static mode of 2 (corona line speed mode) and electrode potential of −5.2 KV by using an electrostatic copying paper tester SP-428 (manufactured by Kawaguchi Electric Co.,Ltd.), and the surface potential of the plate was measured(Vo). 5 lux of a white light or 800 nm light adjusted to 1 μW was irradiated to the plate, and the sensitivity of said light exposure half-value amount (E½) was determined on the basis of a time during which an amount of charge decreased until it became ½.

In evaluation of the repetition characteristics, an electrophotographic plate was corona-charged under the conditions of −5.2 KV and 120 mm/sec. of corona line speed, kept in a dark place and exposed to a light of 5 lux for 3 seconds, and the surface potential, residual potential and sensitivity degradation were measured. The residual potential denotes a potential measured after the light irradiation for 3 seconds.

In the spectral sensitivity, an electrophotographic plate was corona-charged at −5.2 KV by the use of an electrostatic charge tester, and then irradiated with a monochromatic light through a monochrometer (manufactured by Jovanibon) by the use of a xenon lamp as a light source, and the spectral sensitivity was measured by light attenuation when charged and exposed.

EXAMPLES 2-7

The phthalocyanine derivative prepared in Referential Example or the other material was added, in a proportion shown in Table 6, to 10 parts of the TiOPo crude prepared in Example 1, and each of the addition products was milled by a ball mill.

TABLE 6

| Example | Additive | Part by weight |
|---|---|---|
| 2 | 1-d | 0.3 |
| 3 | 2-a | 0.4 |
| 4 | 3-b | 0.7 |
| 5 | 4-e | 0.5 |
| 6 | 5-d | 0.5 |
| 7 | $SiO_2$ | 0.2 |

In Examples 2-7, X-ray diffration charts identical to that of FIG. 1 were obtained after the above addition products were ball-milled for 100 hours, that is, noncrystallization took place for a shorter period of time than in Example 1. The shorter period of time for the noncrystallization is presumably because the addition made the orientation state of phthalocyanine random and had a good effect on atomization and noncrystallization thereof.

An electrophotographic plate was prepared in the same way as in Example 1 by the use of the resulting noncrystalline titanium phthalocyanine compound as a charge-generating layer, and the properties thereof were measured. The results are shown in Table 8.

EXAMPLE 8

Ten parts of the TiOPc crude prepared in Example 1 was gradually dissolved in 40 parts of 97% sulfuric acid at 2° C., and their mixture was stirred for 1 hour with maintaining its temperature at not higher than 5° C. Then, the resulting sulfuric acid solution was slowly poured into 400 parts of ice water with stirring at a high speed, and crystals precipitated were filtrated. The crystals were washed with distilled water until the acid did not remain, and then dried to give 9 parts of a titanium phthalocyanine compound. One part of this TiOPc was milled by a ball mill for 80 hours.

The sample so obtained did not show an intense X-ray diffration peak in the X-ray diffraction chart, and had noncrystallinity. An electrophotographic sensitized plate was prepared in the same way as in Example 1, and its properties were measured. The results are shown in Table 8.

EXAMPLES 9-14

The phthalocyanine derivative prepared in Referential Example or the other material was added, in a proportion shown in Table 7, to 10 parts of the TiOPc crude prepared in Example 1, and mixed together and then the mixture was gradually dissolved in 200 parts of 97% sulfuric acid solution at 2° C., and the resulting mixture was stirred for 1 hour with maintaining its temperature at not higher than 5° C. Then, this sulfuric acid solution was slowly poured into 2000 parts of ice water with stirring at a high speed, and crystals precipitated were filtrated. The crystals were washed with distilled water until the acid did not remain, and then dried to give a titanium phthalocyanine compound.

TABLE 7

| Example | Additive | Part by weight |
|---|---|---|
| 9 | 1-e | 0.3 |
| 10 | 2-f | 0.8 |
| 11 | 3-a | 0.7 |
| 12 | 4-h | 0.5 |
| 13 | 5-k | 0.5 |
| 14 | $TiO_2$ | 0.3 |

One part of the titanium phthalocyanine compound was milled by a ball mill for 30 hours. The products so obtained did not show an intense X-ray diffraction peak in X-ray diffraction chart, and had noncrystallinity. Electrophotographic plates were prepared in the same way as in Example 1, and the properties thereof were measured. The results are shown in Table 8.

EXAMPLE 15

Ten parts of the TiOPc crude prepared in Example 1 was deposited on a substrate by heating it to 450° C. under a vacuum of $10^{-5}$ torr to sublimate it, and 9.5 parts of the deposit was obtained. The deposited TiOPc was milled by a ball mill for 200 hours to give noncrystalline TiOPc.

An electrophotographic plate was prepared therefrom and its properties were measured. The results are shown in Table 8.

TABLE 8

| Example | $V_0$ (−V) | $E_{\frac{1}{2}}$ (lux · sec) | $E_{\frac{1}{2}}$ at 800 nm ($\mu J/cm^2$) |
|---|---|---|---|
| 1 | 600 | 0.9 | 0.38 |
| 2 | 600 | 0.9 | 0.38 |
| 3 | 595 | 0.9 | 0.37 |
| 4 | 610 | 0.7 | 0.30 |
| 5 | 615 | 0.8 | 0.34 |
| 6 | 600 | 0.9 | 0.38 |
| 7 | 590 | 0.8 | 0.33 |
| 8 | 600 | 0.7 | 0.31 |
| 9 | 615 | 0.9 | 0.37 |
| 10 | 600 | 0.8 | 0.34 |
| 11 | 620 | 0.7 | 0.30 |
| 12 | 600 | 0.8 | 0.33 |
| 13 | 605 | 0.8 | 0.34 |
| 14 | 595 | 0.9 | 0.36 |
| 15 | 610 | 0.8 | 0.33 |

EXAMPLES 16-21

The phthalocyanine derivative prepared in Referential Example or the other material was added, in a proportion shown in Table 9, to 10 parts of the TiOPc crude prepared in Example 1 and mixed together, and then the mixture was gradually dissolved in 200 parts of 97% sulfuric acid at 2°. The resulting mixture was stirred for 1 hour with maintaining its temperature at not higher than 5° C. And then this sulfuric acid solution was poured slowly into 2000 parts of ice water with stirring at a high speed, and crystals precipitated were filtrated. The crystals were washed with distilled water until the acid did not remain, and dried to give a titanium phthalocyanine compound.

Figure 2:
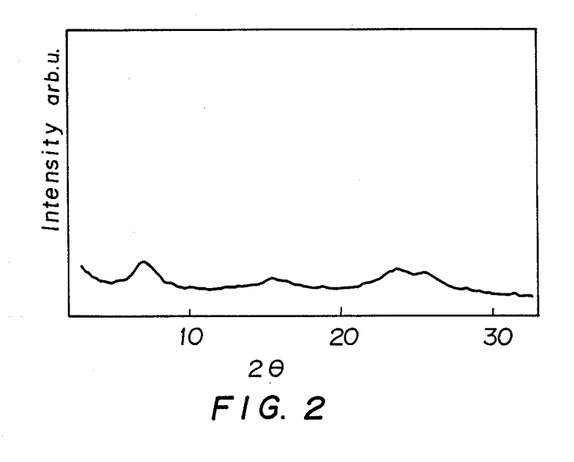

FIG. 2 shows a X-ray diffraction chart of the titanium phthalocyanine compound obtained in Example 16.

Said compound of Example 16 was a pseudo-noncrystalline titanium phthalocyanine compound having broad X-ray diffraction peaks at 6.9°, 15.5°, 23.4° and 25.5° of Bragg angle ($2\theta \pm 0.2°$) X-ray diffraction charts of Example 17–21 were also nearly identical with that of Example 16. An electrophotographic plate was prepared in the same way as in Example 1 and its properties were measured. The results are shown in Table 10.

EXAMPLE 22

A precipitate obtained by carrying out the acid pasting in the same way as in Example 16 was washed with distilled water until the acid did not remain, and then washed with an acetone solution to give a titanium phthalocyanine compound.

Figure 3:
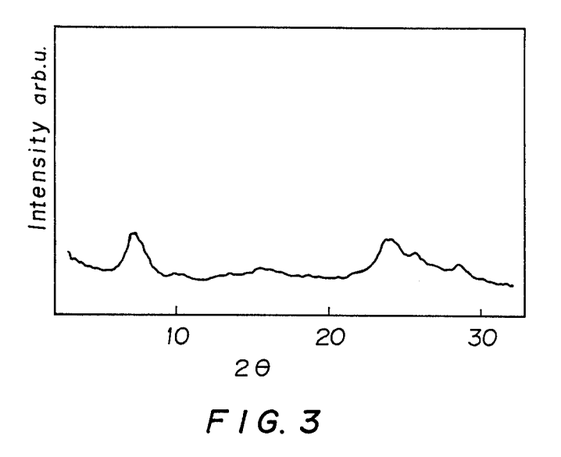

FIG. 3 shows a X-ray diffraction chart of the resulting titanium phthalocyanine compound. Said resulting compound had a peak intensity somewhat higher than that of FIG. 2, however, had pseudo-noncrystallinity having broad X-ray diffraction peaks at 6.9°, 15.5°, 23.4° and 25.5° of Bragg angle ($2\theta \pm 0.2$). An electrophotographic plate was prepared in the same way as in Example 1 and its properties were measured. The results are shown in Table 10.

EXAMPLE 23

The aforesaid 3-a phthalocyanine derivative (0.5 parts) was added to 10 parts of the TiOPc crude prepared in Example 1 and mixed together. The mixture was added to 80 parts of 78% sulfuric acid at 10° C. and the resulting solution was stirred for 1 hour with maintaining its temperature at not higher than 10°. The solution was poured into 400 parts of water, and precipitated crystals were filtrated. The crystals were washed with distilled water until the acid did not remain, and dried to give titanium phthalocyanine compound.

The compound so obtained showed X-ray diffraction chart nearly identical to those of titanium phthalocyanine of Examples 16–21.

EXAMPLE 24

Phthalodinitrile(15.4 parts), 5 parts of 4-chlorophthalodinitrile and 7.6 parts of titanium tetrachloride were reacted in 150 parts of quinoline for 4 hours at 220° C. under heat, and then the solvent was removed by aqueous vapor distillation. Then, the resulting product was purified with a 2% hydrochloric acid aqueous solution, with a 2% sodium hydroxide aqueous solution and further with acetone, and the resulting product was dried to give oxotitanium phthalocyanine chloride (TiOPc-Cl$_n$) in which n denotes an average substituent number. n in this product was 0.22. Further, the acid pasting was carried out in the same way as in Example 16 without an additive.

Figure 4:
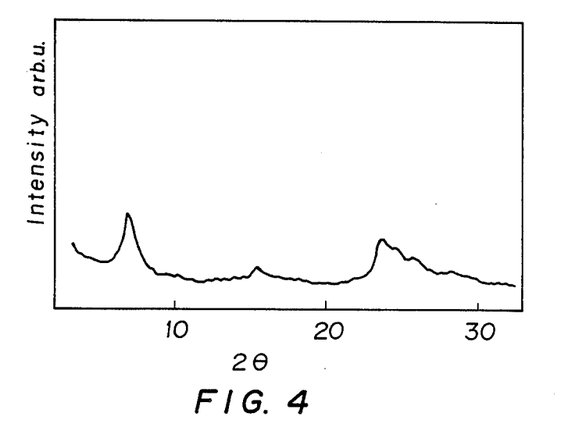

FIG. 4 shows X-ray diffraction chart of the oxotitanium phthalocyanine chloride obtained in this Example. An electrophotographic plate was prepared in the same way as in Example 1 and its properties were measured. The results are shown in Table 10.

EXAMPLE 25

Phthalodinitrile (20.4 parts) and 7.6 parts of titanium tetrachloride were charged into a flask and mixed. The temperature was elevated from room temperature. The mixture started to emit white smoke at a temperature of about 150° C., and a reaction took place at 180° C. to deposit blueish green-colored crystals on the flask wall. The reaction product was further heated for 2 hours at 180°–200° C., and then purified with a 2% hydrochloric acid aqueous solution, with a 2% sodium hydroxide and further with acetone, and then the resulting product was dried to give oxotitanium phthalocyanine chloride (TiOPc-Cl$_n$), in which n was 0.51. Further, the acid pasting was carried out in the same way as in Example 16 except the addition of 5% by weight of additive 2-a. An electrophotographic sensitized plate was prepared in the same way as in Example 1 and its properties were measured. The results are shown in Table 10.

EXAMPLE 26

Ten parts of a titanium phthalocyanine compound obtained in the same way as in Example 18, 20 parts of crushed salt and 8 parts of polyethylenglycol were charged into a kneader and milled at 60°–130° C. for 8 hours. The milled product was then filtrated, washed with water and dried to give a sample.

Figure 5:
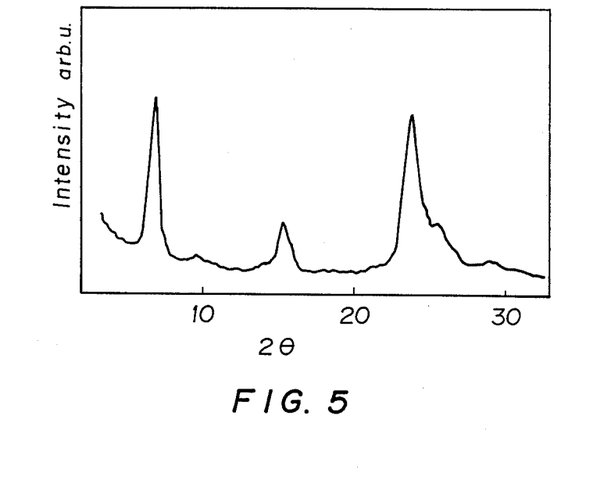
FIG. 5 shows X-ray diffraction chart of a crystalline titanium phthalocyanine compound which is a precursor of the pseudo-noncrystalline titanium phthalocyanine compound of this invention and has the same Bragg angles as those of the pseudo-noncrystalline titanium phthalocyanine compound.

FIG. 5 shows X-ray diffraction chart of the resulting titanium phthalocyanine compound. The compound had intense X-ray diffraction peaks at 6.9°, 15.5°, 23.4° and 25.5° of Bragg angle ($2\theta \pm 0.2°$). The above titanium phthalocyanine compound was milled by a ball mill for 15 hours. X-ray diffraction measurement thereof showed broad X-ray diffraction peaks having intensity nearly identical to that of FIG. 2 and it thus showed pseudo-noncrystallinity.

An electrophotographic plate was prepared in the same way as in Example 1 and its properties were measured. The results are shown in Table 10.

TABLE 10

| Example | Vo (−V) | E ½ (lux · sec) | E ½ at 800 nm ($\mu J/cm^2$) |
|---|---|---|---|
| 16 | 610 | 0.7 | 0.31 |
| 17 | 620 | 0.7 | 0.32 |
| 18 | 610 | 0.6 | 0.27 |
| 19 | 600 | 0.6 | 0.28 |
| 20 | 620 | 0.7 | 0.32 |
| 21 | 615 | 0.7 | 0.31 |
| 22 | 600 | 0.6 | 0.27 |
| 23 | 610 | 0.7 | 0.30 |
| 24 | 605 | 0.6 | 0.28 |
| 25 | 610 | 0.7 | 0.30 |
| 26 | 610 | 0.7 | 0.30 |

The electrophotographic plates of Examples 1 to 26 had little change in surface potential, sensitivity and residual potential in the case of repeated use, and exhibited good properties.

EXAMPLES 27–28

The noncrystalline titanium phthalocyanine compound of Example 1 and the pseudo-noncrystalline titanium phthalocyanine compound of Example 18 were used in these Examples 27 and 28. These two compounds were deposited at $10^{-6}$ torr on PET films on which aluminum had been deposited to give 0.1 micron thick charge-generating layers. Charge-transferring layers were formed thereon respectively in the same way as in Example 1. The properties of the resulting products were measured. Table 11 shows the electrophotographic properties thereof.

TABLE 11

| Example | Vo (−V) | E ½ (lux · sec) | E ½ at 800 nm ($\mu m/cm^2$) |
|---|---|---|---|
| 27 | 650 | 0.7 | 0.32 |
| 28 | 645 | 0.6 | 0.28 |

EXAMPLES 29-30

The noncrystalline titanium phthalocyanine compound of Example 1 and the pseudo-noncrystalline titanium phthalocyanine compound of Example 18 were used in these Examples 29 and 30. Monolayer electrophotographic plates were prepared respectively in the following manner.

One part of a titanium phthalocyanine compound, 1 part of 1-phenyl-1,2,3,4-tetrahydroquinoline-6-carboxyaldehyde-1',1'-diphenylhydrazone and 6 parts of a polyester resin (manufactured by TOYOBO Co.,Ltd Vylon 200) were dispersed in a ball mill together with 20 parts of methylene chloride for 3 hours to prepare a coating liquid. The coating liquid was coated on a film having an undercoated layer prepared in the same way as in Example 1, and then the coated film was dried to give an electrophotographic plate having a coat thickness of 15 microns.

The measurment was carried out in the same way as in Example 1 except that the corona charge was applied with a positive charge (+5.2 KV). The results are shown in Table 12.

TABLE 12

| Example | Vo (+V) | E ½ (lux · sec) | E ½ at 800 nm (μJ/cm$^2$) |
|---|---|---|---|
| 29 | 550 | 0.8 | 0.42 |
| 30 | 560 | 0.7 | 0.35 |

COMPARATIVE EXAMPLE 1

Phthalodinitrile (20.4 parts) and 7.6 parts of titanium tetrachloride were stirred in 150 parts of α-chloronaphthalene at 230° C. for 3 hours, and then left to stand for cooling, and the product was filtrated under heat at 100°-130° C., and washed with α-chloronaphthalene heated upto 100° C. Further, the product was filtrated with methanol, and washed with water repeatedly until its pH became 6-8. The resulting wet cake was stirred in N-methylpyrolidone under heat at 140°-150° C. for 2 hours, then filtrated, washed with methanol and dried to give 15.8 parts of TiOPc.

Figure 6:
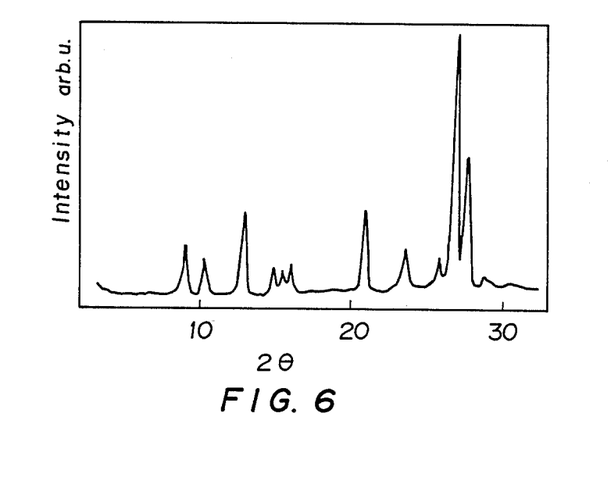
FIGS. 6 to 8 show X-ray diffraction charts, measured by using Cu-Kα beam, of the oxotitanium phthalocyanine compounds obtained in the conventional processes.

The measurement of X-ray diffraction chart of this TiOPc shows an intense X-ray diffraction line as shown in FIG. 6. An electrophotographic plate was prepared by the use of this TiOPc as a charge-generating agent in the same way as in Example 1, and its electrophotographic properties were measured. The results are shown in Table 13.

COMPARATIVE EXAMPLE 2

Phthalodinitrile (20.4 parts) and 7.6 parts of titanium tetrachloride were stirred in 150 parts of α-chloronaphthalene at 220° C. for 3 hours, and then filtrated. Further, the filtrate was refluxed with 200 parts of concentrated aqueous ammonia under heat for 1 hour, and then washed with acetone and dried.

Figure 7:
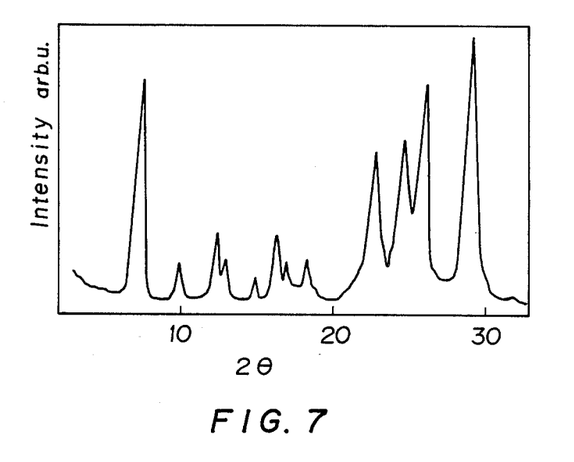

FIG. 7 shows X-ray diffraction chart of the resulting TiOPc. An electrophotographic plate was prepared by the use of this TiOPc as a charge-generating agent in the same way as in Example 1, and its electrophotographic properties were measured. The results are shown in Table 13.

COMPARATIVE EXAMPLE 3

Ten parts of TiOPc obtained in Comparative Example 2 was dissolved little by little in 97% sulfuric acid at 2° C., and the resulting mixture was stirred for 1 hour with keeping its temperature at not higher than 5° C. And then this sulfuric acid solution was gradually poured into 2,000 parts of ice water with stirring at high speed and precipitated crystalls were filtrated, washed with distilled water until the acid did not remain, and dried to give TiOPc.

Figure 8:
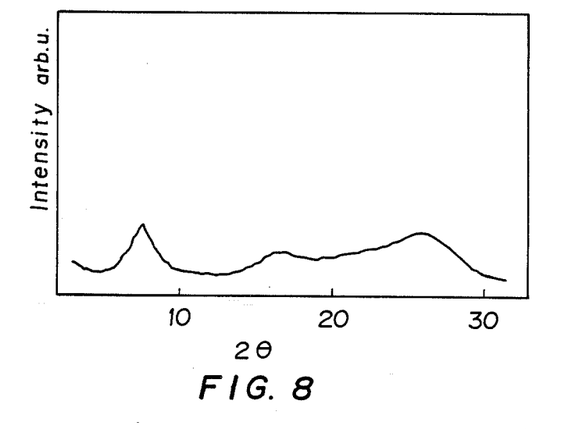

FIG. 8 shows X-ray diffraction chart of TiOPc obtained in Comparative Example 3. The resulting TiOPc had broad peaks on X-ray diffraction chart, however, it was an α-type low crystalline product having X-ray diffraction peaks at 7.5°, 16.3° and 25.3° of Bragg angle. An electrophotographic plate was prepared by the use of this TiOPc as a charge-generating agent in the same way as in Example 1, and its electrophtographic properties were measured. The results are shown in Table 13.

TABLE 13

| Comparative Example | Vo (−V) | E ½ (lux · sec) | E ½ at 800 nm (μJ/cm$^2$) |
|---|---|---|---|
| 1 | 580 | 1.5 | 0.57 |
| 2 | 550 | 1.2 | 0.46 |
| 3 | 575 | 1.2 | 0.45 |

The above properties are inferior to those of the noncrystalline and pseudo-noncrystalline titanium phthalocyanine compounds obtained according to this invention in sensitivity to both white light and 800 nm light.

Figure 9:
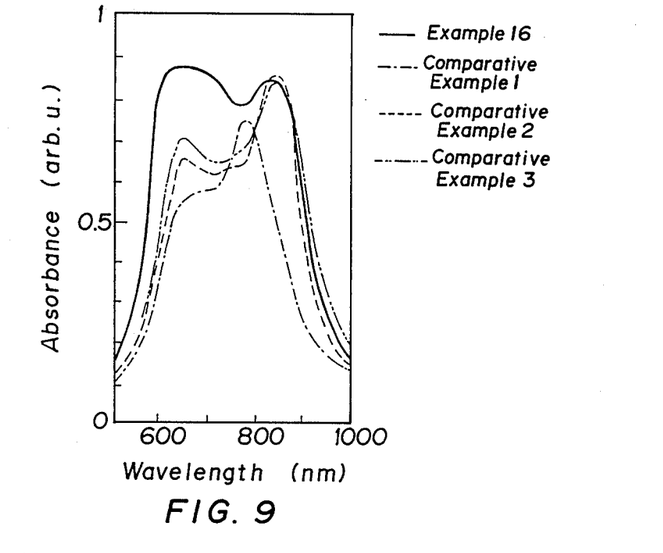
FIG. 9 shows a UV-Vis spectrum chart of a charge-generating layer of the pseudo-noncrystalline titanium phthalocyanine compound of this invention and the oxotitanium phthalocyanine compound obtained in the conventional process.
Figure 10:
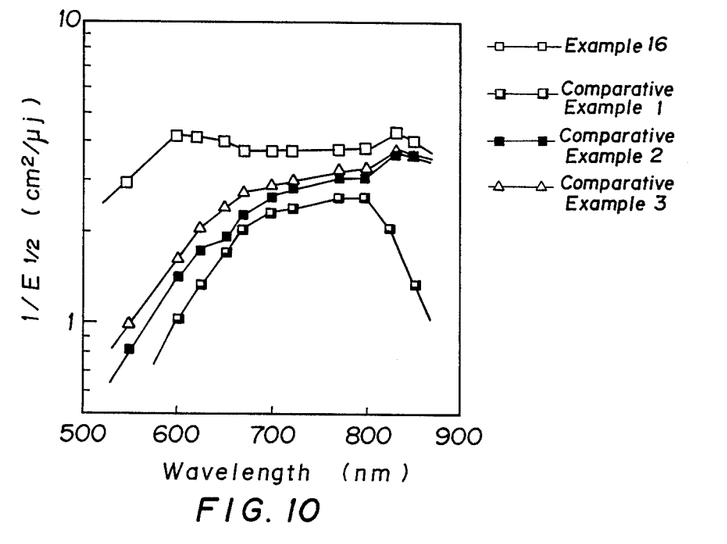
FIG. 10 shows spectral sensitivity of an electrophotographic plate obtained by using the pseudo-noncrystalline titanium phthalocyanine compound of this invention and the oxotitanium phthalocyanine compound, obtained in the conventional process.

Coating liquids prepared for charge generation were coated in a coating thickness of 0.2 micron on glass plates which surfaces were polished, and UV-Vis spectra were measured. FIG. 9 shows the results thereof with regard to typical Example 16 and Comparative Examples 1, 2 and 3. An electrophtographic plate using the pseudo-noncrystalline titanium phthalocyanine compound of Example 16 had large absorption peaks in regions of 600-700 nm and 800-850 nm. Meanwhile, in an electrophotographic plate obtained in Comparative Example 1, λmax is about 770 (nm) and the absorption is small in the wavelengths shorter and longer than said 770 nm. In Comparative Example 2, λmax is about 830 (nm) and the absorption is larger than in Comparative Example 1, however, the absorption in the region of 600-770 (nm) is smaller. The result of Comparative Example 3 is nearly identical with that of Comparative Example 2. The spectral sensitivity each of the electrophotographic plates prepared in Example 16 and Comparative Examples 1 and 2 are shown in Table 10. The plate obtained in Example 16 has not only high sensitivity but nearly constant sensitivity in the region of 600-850 nm, however, the plate of Comparative Example 1 has low sensitivity and degraded sensitivity in the wavelength of not shorter than 800 nm. Therefore, it cannot be said to have stable sensitivity in the wavelength of diode laser. The plates of Comparative Examples 2 and 3 have better sensitivity than that of Comparative Example 1. However, their sensitivity is lower than that of the plate of Example 16 and their degradation in the sensitivity is large in the wavelength of not longer than 700 nm. The plates of Examples 1-29 are somewhat different in sensitivity, however, have nearly constant sensitivity as in Example 16 in the wavelength of 600-850 nm.

Further, the electrophotographic plates prepared in Examples were applied to a drum of an electrophotographic copying machine having a corona charger, exposure portion, developing portion, transfering portion, charge-removing exposure portion and cleaner. By using this copying machine in which the dark portion potential was set at −650 V and the light portion portential at −150 V, repeat durability test of 5,000 sheets was carried out to compare the resulting images.

As a result of the above durability test, the electrophotographic plates using the compounds of Examples 1–30 produced clear images. The produced images maintained the initially printed density and scarecely had white or black spots; It is seen that the electrophotographic plates obtained according to this invention have sensitivity of not less than 0.4 $\mu J/cm^2$ in the 650 nm LED oscillation wavelength region and the 800 nm diode laser oscillation wavelength region.

What is claimed:

1. An optical semiconductor material comprising:
    (1) a noncrystalline material comprising a titanium phthalocyanine compound selected from the group consisting of a titanium phthalocyanine compound having no substituents on the benzo moieties of the molecule, and a low halogenated titanium phthalocyanine compound having not more than 0.51 halogen substituents in the titanium phthalocyanine molecule, which does not substantially show X-ray diffraction peak in X-ray diffraction chart, or
    (2) a pseudo-noncrystalline material comprising a titanium phthalocyanine compound selected from the group consisting of a titanium phthalocyanine compound having no substituents on the benzo moieties of the molecule, and a low halogenated titanium phthalocyanine compound having not more than 0.51 halogen substituents in the titanium phthalocyanine molecule which shows broad X-ray diffraction peaks at 6.0°, 15.5°, 23.4° and 25.5° of Bragg angle (2θ≅0.2°), or
    (3) a mixture of said noncrystalline and said pseudo-noncrystalline materials.

2. The optical semiconductor material of claim 1 wherein the titanium phthalocyanine compound has a core of TiO.

3. The optical semiconductor material of claim 1 wherein the titanium phthalocyanine compound does not substantially contain any substituent other than halogen.

4. The optical semiconductor material of claim 1 wherein the optical semiconductor material further contains a phthalocyanine derivative having a substituent in at least one benzene nucleus of the phthalocyanine molecule.

5. The optical semiconductor material of claim 3 wherein the phthalocyanine derivative is without a metal in the core thereof or has a core of centrally coordinated metal selected from the class consisting of titanium, copper, nickel, cobalt, aluminum, vanadium and gallium, or oxide or chloride thereof.

6. The optical semiconductor material of claim 3 wherein the mixing ratio between the titanium phthalocyanine compound and the pthalocyanine derivative is from 100/50 to 100/0.1 by weight.

7. The optical semiconductor material of claim 1 wherein the titanium phthalocyanine compound is prepared through a crystal transition or noncrystallization step thereof.

8. The optical semiconductor material of claim 1 wherein the noncrystalline titanium phthalocyanine compound is prepared by subjecting a mixture of a crystalline titanium phthalocyanine compound and a phthalocyanine derivative to acid pasting or acid slurry treatment and then subjecting the mixture to a mechanical milling-noncrystallization step until the same does not substantially show X-ray diffraction peak in X-ray diffraction chart.

9. The optical semiconductor material of claim 1 wherein the noncrystalline titanium phthalocyanine compound is prepared by subjecting a crystalline titanium phthalocyanine compound to a mechanical milling-noncrystallization step until the same does not substantially show X-ray diffraction peak in X-ray diffraction chart.

10. The optical semiconductor material of claim 1 wherein the noncrystalline titanium phthalocyanine compound is prepared by subjecting a crystalline titanium phthalocyanine compound to acid pasting or acid slurry treatment, then adding a phthalocyanine derivative thereto and subjecting the resulting mixture to mechanical milling-treatment until the mixture does not substantially show X-ray diffraction peak in X-ray diffraction chart.

11. The optical semiconductor material of claim 1 wherein the noncrystalline titanium phthalocyanine compound is prepared by adding at least one oxide selected from the class consisting of titanium oxide, zinc oxide and silicon oxide in place of the phthalocyanine derivative at the time of subjecting a crystalline titanium phthalocyanine compound to acid pasting or acid slurry treatment.

12. The optical semiconductor material of claim 1 wherein the noncrystalline titanium phthalocyanine compound is prepared by adding at least one oxide selected from the class consisting of titanium oxide, zinc oxide and silicon oxide in place of the phthalocyanine derivative at the time of subjecting a crystalline titanium phthalocyanine compound to mechanical milling-treatment.

13. The optical semiconducrtor material of claim 1 wherein the pseudo-noncrystalline titanium phthalocyanine compound is prepared by adding a phthalocyanine derivative to a crystalline titanium phthalocyanine compound and subjecting the resulting mixture to acid pasting or acid slurry treatment.

14. The optical semiconductor material of claim 1 wherein the psuedo-noncrystalline titanium phthalocyanine compound is prepard by adding at least one oxide selected from the class consisting of titanium oxide, zinc oxide and silicon oxide in place of the phthalocyanine derivative at the time of subjecting a crystalline titanium phthalocyanine compound to acid pasting or acid slurry treatment.

15. An electrophotographic plate comprising an electrically conductive substrate, and a charge-generating layer and a charge-transferring layer on the electrically conductive substrate, characterized in that the charge-generating layer contains the noncrystalline and/or pseudononcrystalline titanium phthalocyanine compounds of claim 1.

* * * * *